June 26, 1923.
R. W. SHAFOR
PROCESS FOR CONVERTING THE CARBONATES OR SULPHIDES OF BARIUM OR STRONTIUM INTO THE CORRESPONDING HYDRATES
Filed Aug. 27, 1920
1,460,180
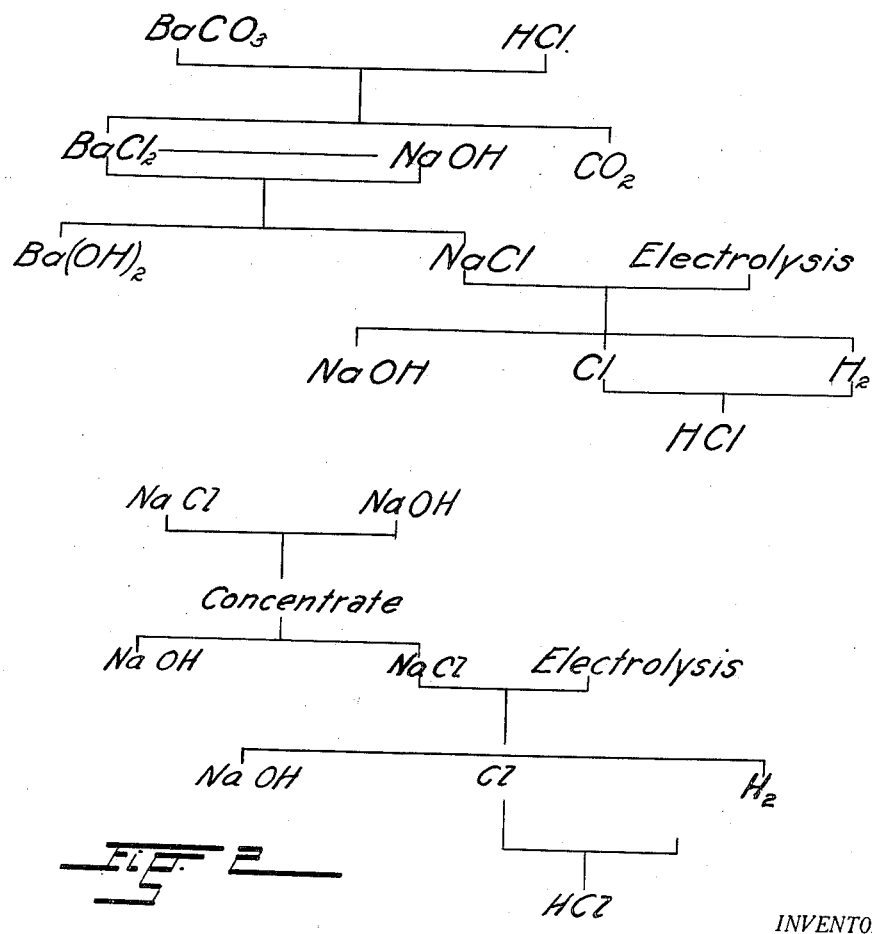

Patented June 26, 1923.

1,460,180

UNITED STATES PATENT OFFICE.

RALPH W. SHAFOR, OF DENVER, COLORADO.

PROCESS FOR CONVERTING THE CARBONATES OR SULPHIDES OF BARIUM OR STRONTIUM INTO THE CORRESPONDING HYDRATES.

Application filed August 27, 1920. Serial No. 406,281.

*To all whom it may concern:*

Be it known that I, RALPH W. SHAFOR, a citizen of the United States, residing at Denver, in the county of Denver and State of Colorado, have invented certain new and useful Improvements in Processes for Converting the Carbonates or Sulphides of Barium or Strontium into the Corresponding Hydrates, of which the following is a specification.

This invention relates to a process for converting the carbonates or sulphides of barium or strontium into the corresponding hydrates.

Heretofore it has been commercial practice to effect this conversion by the use of heating or furnacing the carbonates thereby driving off the carbon dioxide and obtaining a product, barium oxide, which upon slacking with water forms the hydrate. In the case of the sulphides the product has been treated in solution with sodium carbonate, the resulting precipitate, barium carbonate, being treated as above. The primary disadvantages in these methods are the destructive action of the highly caustic chemicals, barium and strontium oxides, at the high temperatures upon furnace linings, high losses due to dusting of the chemicals being produced, and, where electric furnaces are used, the destruction of electrodes, all resulting in a high cost of production.

It is an object of the present invention to provide a wet method of producing barium hydrate $(Ba(OH)_2)$ which eliminates the above disadvantages, reduces the cost of production, and renders possible the production of a salt suitable for electrolysis. Another object resides in including in this process, a simple method of effecting the regeneration of the reagents such as hydrochloric acid and caustic soda used in the process.

While my improved process may be used for many other purposes it is particularly adapted for use in connection with the recovery of barium from the sludge produced in the recovery of sugar from molasses especially beet molasses, it being a common expedient to treat the molasses with barium hydrate to precipitate the sugar as barium saccharate. Thereafter the precipitated saccharate is separated from the accompanying solution which contains, in addition to most of the impurities in the original molasses, a considerable portion of soluble barium salts. In the case of the saccharate thus obtained, the barium is precipitated as barium carbonate by treating a water suspension of the saccharate with carbon dioxid, the sugar going into solution, while in the case of the accompanying solution the barium is precipitated as barium carbonate by treating with carbon dioxide also. These precipitates are separated from the respective solutions as far as practicable and leave the process as a sludge containing in addition to the barium carbonate some barium sulfate and varying amounts of other impurities, mostly organic.

The first step in the present process consists in treating barium carbonate $(BaCO_3)$ together with some minor impurities suspended in water, with hydrochloric acid $(HCl)$ either in the form of solution or a gas, preferably the latter.

The object of this step is to convert the barium to barium chloride $(BaCl_2)$ which is soluble in water and to liberate carbon dioxide $(CO_2)$ which may, if desired, be used as a by-product. The impurities such as barium sulfate, remain undissolved and suspended in the barium chloride solution to be separated from it by suitable means. Further a part of that portion of soluble impurities, which may be present, may be precipitated by rendering the barium chloride solution alkaline, preferably with caustic soda, to an extent of approximately 0.5% or more, and may be separated from the solution by suitable means.

The second step in my process is the treatment of the barium chloride solution with a solution of caustic soda $(NaOH)$ (solid caustic soda may be used) thus converting the barium to barium hydrate $(Ba(OH)_2)$ and the sodium to sodium chloride $(NaCl)$. By reason of the fact that barium hydrate is much less soluble in aqueous solutions of salt or mixtures of salt and caustic soda at lower temperatures, say 20° C. and below, than is either barium chloride in water or barium hydrate in the above solutions at higher temperatures a large quantity (often as much as 95 to 99%) will precipitate out from a concentrated hot solution as the solution is cooled.

Although this precipitation will take place from solutions of widely varying concentrations it is probably most effectively accomplished from solutions containing 40 grams of $BaCl_2$ per 100 grams of water and 60 gms.

of NaOH per 100 gms. of water or higher concentrations. At the temperatures and concentrations above mentioned, the sodium chloride formed by the reaction will remain in solution after the barium hydrate is precipitated and thus the insoluble barium hydrate may be separated from the soluble sodium chloride and soluble portion of the barium by suitable mechanical means.

In the case of the precipitation of the barium hydrate by the addition of the caustic soda to the barium chloride, it has been found that the use of an excess of caustic soda over the theoretical quantity (said excess remaining dissolved in the sodium chloride solution) lowers the solubility of the precipitating barium hydrate in that solution, and thereby results in a higher yield of crystallized barium hydrate than is possible without said excess. The amount of excess caustic soda permissible in this step is dependent upon the concentration of the original solutions of barium chloride and caustic, which in turn determine the concentration of the sodium chloride solution produced. The latter in turn, limits the amount of caustic which can be present in the barium hydrate precipitation-step without precipitating sodium chloride along with the barium hydrate, and thereby contaminating the latter and at the same time unnecessarily losing sodium chloride. Another object which may be attained through the use of excess caustic will be pointed out in connection with the next step in this process.

It should be remembered in connection with the steps of this process so far described that the barium travels in a closed cycle and that while in contact with the molasses becomes contaminated with sugar, alkali salts, some organic substances, etc. It has been found advisable in most cases to remove these impurities as far as possible by known mechanical means such as washing to remove the solubles and calcination to remove or render inactive the organic insolubles. Some soluble substances remain, usually, with the barium on each cycle as it enters the barium hydrate precipitation-step. These substances together with the soluble barium leave this step in the process as contaminants in the salt solution and affect its value for the further operation of the process.

As has been stated it is one of the objects of this process to produce a salt or salt solution suitable for electrolysis. By "suitable for electrolysis" I refer to the fact that in the present state of development of the electrolytic alkali-chlorine cells (especially the diaphragm type) and processes, efficient operation depends upon electrolyzing a saturated sodium chloride solution of relatively high purity. The impurities most commonly met with are the alkaline earths, especially calcium and magnesium, sulfates, and insoluble matter. It is a common expedient to render insoluble the soluble members of these impurities by the use of chemical reagents in preparing the brine solution for electrolysis, and separate the precipitates from the solution by suitable means. It is also a common expedient to render the solution fed to electrolytic cells slightly acid to prevent the formation of chlorates, etc. in the cell, rather than for the purification of the brine. An excessive amount of barium compounds would fall under the classification of alkaline earth impurities above mentioned.

It is a further object of this process to eliminate losses of barium. As has been pointed out, the sodium chloride solution from the barium hydrate precipitation-step will usually contain from 1 to 5% of barium compounds introduced in the step and under certain conditions even more, depending upon the temperatures and concentrations of the solutions employed. This would be lost in case the process were stopped at that point, or its value would be lessened in case it were precipitated by chemical means, say for example as a carbonate, and returned to the process because of the further reagents used to reconvert it to its chloride-state.

By using solutions of sufficiently high concentration and final precipitation-temperatures sufficiently low, in the barium hydrate precipitation-step, it is possible to produce a sodium chloride solution which, with the addition of salt or by evaporation to bring the concentration up to saturation, is directly suitable for electrolysis. This, however, is only feasible when barium compounds of reasonably high purity are introduced into the process, otherwise the sodium chloride used in the electrolytic-cycle (described later) will become contaminated to the point where it is no longer suitable for electrolysis. In this case the barium in the salt solution must not be in excess of the amount which will pass through the cell and be returned with the caustic soda ultimately to the barium hydrate precipitation-step.

Further, it is possible, when the caustic soda used in the barium hydrate precipitation-step is not in excess of the theoretical amount required, to crystallize salt suitable for electrolysis directly from the sodium chloride solution so produced. In this case only a portion of the salt may be crystallized from the solution, in case the barium content of the solution is too high to allow the solution to be electrolyzed directly, without lowering the efficiency of the electrolytic operation. The temperature at which the crystallization is effected must be well above that at which the final precipitation of barium hydrate is effected and the remaining solution separated from the salt crystals at a like temperature, losses of barium thus being avoided by returning the remaining solution to the barium hydrate precipitation-step.

The following method of procedure which constitutes the third step in the process has been found preferable to either of the above, especially in the case of treating barium recovered from the saccharate process. As has been pointed out, the use of an excess of caustic soda decreases the amount of barium compounds contaminating the sodium chloride solution produced in the barium hydrate precipitation station. Also, in many cases, there are present in the sodium chloride solution other impurities which render it less suitable for electrolysis. I have found that it is possible by adding an additional quantity of caustic soda to the sodium chloride resulting from the treatment of barium chloride with sodium hydrate to materially increase the amount of salt, suitable for electrolysis which can be crystallized from the solution, recovering in fact as high as 90 to 95% of the sodium chloride present. The caustic soda solution here acts as a solvent for the impurities which are held entrapped, in a sense, in the cycle which this solution travels, i. e., from the barium hydrate precipitation-station through the salt crystallization-step and back to the precipitation-station again. On concentrating the solution the sodium chloride crystals are suspended in the strong sodium hydrate solution and may be separated therefrom by suitable means. The fact that there is also less barium compounds in this circuit when the excess caustic is used, renders possible a wider range of precipitation-conditions in the barium hydrate precipitation-station with equally good results, so far as the crystallized salt is concerned. I have found that even better results are obtained by adding to the solution produced in the barium hydrate precipitation-step and containing sodium chloride, the excess caustic soda, soluble barium salts and other impurities; the solution coming from electrolysis known as "cell effluent" and which contains the caustic soda which will be used later in the precipitation of barium hydrate. With this procedure, the amount of solvent for the above mentioned impurities is materially increased and hence the chances for contaminating the salt crystals decreased. It should be mentioned here that the amount of barium compounds which travel this cycle with the salt and caustic solutions does not increase with a given set of precipitation-conditions, hence practically all of the barium compounds which enter the barium hydrate precipitation-step with the barium chloride solution, are precipitated. The soluble impurities, however, do increase slowly and may in time become sufficiently concentrated to contaminate the salt rendering the discarding of some salt necessary. This procedure provides also for the concentration of the caustic ahead of its use in the barium hydrate precipitation-step.

The chemistry of the first two of the above steps may be expressed by the following:

(1) $BaCO_3 + 2HCl = BaCl_2 + H_2O + CO_2$
(2) $BaCl_2 + 2NaOH = Ba(OH)_2 + 2NaCl$ or (3) $BaCl_2 + 2NaOH + XNaOH = Ba(OH)_2 + 2NaCl + XNa(OH)$.

Thus far, two reagents have been used in the process, namely, hydrochloric acid and caustic soda and the by-product sodium chloride in the state of solution and crystals have been produced.

The fourth step of my process consists in electrolyzing the sodium chloride so as to produce caustic soda solution, (NaOH) one of the reagents used in the above-described process of producing barium hydrate, and chlorine and hydrogen.

The fifth step of my process provides for the production of hydrochloric acid (HCl) the reagent required in the first step of the same, by burning the chlorine (Cl) produced by the electrolysis of the sodium chloride solution, in the hydrogen obtained in the same action.

With the exception of the production of the hydrochloric acid, the quantity of reagents actually used is within one or two per cent of the theoretical quantity represented by the chemical equations above given, and in burning the chlorine in hydrogen, the supply of the latter should be approximately 10% in excess of the amount theoretically required as per the following equation:

(3) $2H + 2Cl = 2HCl$.

Summarizing the process, in connection with the desugarizing of molasses, the procedure outlined makes possible the continued reconversion of the barium used in the saccharate process into a form of purity suitable for reuse, it also permits the production of sodium chloride suitable for electrolysis and thereby makes possible the continued reconversion of the raw material, from which the reagents used are made, into these reagents.

In the accompanying drawing, the various steps of the process are diagrammatically represented; Figure 1 showing the complete process and Figure 2 the step of crystallizing the sodium chloride by mixing the sodium chloride solution with caustic soda and then concentrating the mixture to obtain a strong caustic soda solution from which the sodium chloride crystals are precipitated as hereinabove described.

Having thus described my improved method of producing barium hydrate from barium carbonate and regenerating the reagents used therein, it will be readily understood that the same process may be employed for the production of barium hydrate from barium sulphide (BaS) or for converting strontium carbonates and sulphides ((SrCO$_3$) and (SrS)) to strontium hydrate (Sr(OH)$_2$).

In producing the barium hydrate from barium sulphide the barium enters the process as barium sulphide dissolved in water and the first step is changed as per the following equation:

(4) $BaS + 2HCl = BaCl_2 + H_2S$

The barium chloride proceeds to the second step of the process as previously described, while the hydrogen sulphide may be utilized as a by-product or discarded as desired.

It will also be readily seen that potassium chloride and caustic potash may be substituted for the sodium chloride and caustic soda specified.

Having thus described my invention what I claim and desire to secure by Letters-Patent is:

1. A cyclic process of recovering barium compounds from residues containing the same, comprising treating the residues with hydrochloric acid to form barium chloride, adding thereto an excess of sodium hydrate to precipitate barium hydrate and form a sodium chloride solution carrying a small percentage of soluble barium salts, cooling the mixture sufficiently to reduce the solubility of the barium hydrate in the liquid menstruum to a minimum, separating the barium hydrate, adding additional sodium hydrate to the sodium chloride solution to keep the impurities therein in solution, concentrating to produce a mother-liquid carrying suspended sodium chloride crystals, sodium hydrate, and a small quantity of soluble sodium chloride and dissolved barium salts, separating the suspended sodium chloride crystals from the mother-liquid, utilizing the latter carrying a small quantity of soluble barium salts in the barium hydrate precipitation-step, dissolving and electrolyzing the sodium chloride to produce sodium hydrate, chlorine and hydrogen, forming hydrochloric acid from the latter two, utilizing the hydrochloric acid from the latter two, utilizing the hydrochloric acid in the barium chloride formation-step, and returning the sodium hydrate to the solution-cycle.

2. A cyclic process of recovering alkaline earth compounds from residues containing the same, comprising treating the latter with hydrochloric acid to form an alkaline earth chloride, adding thereto an excess of alkali hydrate to precipitate the alkaline earth hydrate and form an alkali chloride solution carrying a small quantity of soluble alkaline earth salts, cooling the mixture sufficiently to reduce the solubility of the alkaline earth hydrate to a minimum, separating the alkaline earth hydrate, adding additional alkali hydrate to the alkali chloride solution to keep the impurities therein in solution, concentrating to produce a mother-liquid carrying suspended alkali chloride crystals, alkali hydrate and a small quantity of dissolved alkaline earth salts, separating the suspended alkali-chloride crystals from the mother-liquid, utilizing the latter carrying a small quantity of soluble alkaline earth salts in the alkaline earth hydrate precipitation-step, and treating the alkali chloride to produce alkali hydrate and returning the latter to the solution-cycle.

3. A cyclic process of recovering barium compounds from residues containing the same, comprising treating the residues with hydrochloric acid to form barium chloride, adding thereto an excess of sodium hydrate to precipitate barium hydrate and form a sodium chloride solution carrying a small percentage of soluble barium salts, cooling the mixture sufficiently to reduce the solubility of the barium hydrate in the menstruum liquid to a minimum, separating the barium hydrate, adding additional sodium hydrate to the sodium chloride solution to keep the impurities therein in solution, concentrating to produce a mother-liquid carrying suspended sodium chloride crystals, sodium hydrate, and a small quantity of soluble sodium chloride and dissolved barium salts, separating the suspended sodium chloride crystals from the mother-liquid, utilizing the latter carrying a small quantity of soluble barium salts in the barium hydrate precipitation-step, treating the sodium chloride to produce sodium hydrate and returning the latter to the solution-cycle.

4. A cyclic process of recovering barium compounds from residues containing the same, comprising treating the residues with hydrochloric acid to form barium chloride, adding thereto an excess of sodium hydrate to precipitate barium hydrate and form a sodium chloride solution carrying a small percentage of soluble barium salts, cooling the mixture to a temperature below 20° C., whereby the solubility of the barium hydrate in the liquid menstruum is reduced to a minimum, separating the barium hydrate, adding additional sodium hydrate to the sodium chloride solution to keep the impurities therein in solution, concentrating to produce a mother-liquid carrying suspended sodium chloride crystals, sodium hydrate, and a small quantity of soluble sodium chloride and dissolved barium salts, separating the suspended sodium chloride and dissolved barium salts, separating the suspended sodium chloride crystals from the mother-liquid, utilizing the latter carrying a small quantity of soluble barium salts in the barium hydrate precipitation-step, treating the sodium chloride to produce sodium hydrate, chlorine and hydrogen, forming hydrochloric acid from the latter two, utilizing the hydrochloric acid in the barium chloride formation step, and returning the sodium hydrate to the solution-cycle.

5. A cyclic process of recovering barium compounds from residues containing the same, comprising treating the residues with hydrochloric acid to form barium chloride, adding thereto an excess of sodium hydrate to precipitate barium hydrate and form a sodium chloride solution carrying a small percentage of soluble barium salts, cooling the mixture to a temperature below 20° C., whereby the solubility of the barium hydrate in the liquid menstruum is reduced to a minimum, separating the barium hydrate, adding additional sodium hydrate to the sodium chloride solution to keep the impurities therein in solution, concentrating to produce a mother-liquid carrying suspended sodium chloride crystals, sodium hydrate, and a small quantity of soluble sodium chloride and dissolved barium salts, separating the suspended sodium chloride crystals from the mother-liquid, utilizing the latter carrying a small quantity of soluble barium salts in the barium hydrate precipitation-step, dissolving and electrolyzing the sodium chloride to produce sodium hydrate, chlorine and hydrogen, forming hydrochloric acid from the latter two, utilizing the hydrochloric acid in the barium chloride formation step, and returning the sodium hydrate to the solution-cycle.

6. A cyclic process of recovering barium compounds from residues containing the same, comprising treating the residues with hydrochloric acid to form barium chloride, adding thereto an excess of alkali hydrate to precipitate barium hydrate and form an alkali chloride solution carrying a small quantity of soluble barium salts, cooling the mixture to a temperature below 20° C., whereby the solubility of the barium hydrate in the liquid menstruum is reduced to a minimum, separating the barium hydrate, adding additional alkali hydrate to the alkali chloride solution to keep the impurities therein in solution, concentrating to produce a mother-liquid carrying suspended alkali chloride crystals, alkali hydrate and a small quantity of soluble alkali chloride and dissolved barium salts, separating the suspended alkali chloride crystals from the mother-liquid, utilizing the latter carrying a small quantity of soluble barium salts in the barium hydrate precipitation-step, dissolving and electrolyzing the alkali chloride to produce alkali hydrate, chlorine and hydrogen, forming hydrochloric acid from the latter two, utilizing the same in the barium chloride formation-step and returning the alkali hydrate to the solution-cycle.

7. A cyclic process of recovering alkaline earth compounds from residues containing the same, comprising treating the latter with hydrochloric acid to form an alkaline earth chloride, adding thereto an excess of alkali hydrate to precipitate the alkaline earth hydrate and form an alkali chloride solution carrying a small quantity of soluble alkaline earth salts, cooling the mixture to a temperature below 20° C., whereby the solubility of the alkaline earth hydrate is reduced to a minimum, separating the alkaline earth hydrate, adding additional alkali hydrate to the alkali chloride solution to keep the impurities therein in solution, concentrating to produce a mother-liquid carrying suspended alkali chloride crystals, alkali hydrate and a small quanitty of dissolved alkaline earth salts, separating the suspended alkali chloride-crystals from the mother-liquid, utilizing the latter carrying a small quantity of soluble alkaline earth salts in the alkaline earth hydrate precipitation-step, dissolving and electrolyzing the alkali chloride to produce alkali hydrate, chlorine and hydrogen, forming hydrochloric acid from the latter two, utilizing the same in the alkaline-earth chloride formation-step, and returning the alkali hydrate to the solution cycle.

8. A cyclic process of recovering barium compounds from residues resulting from the treatment of sugar solutions with barium carbonate comprising treating the residue with hydrochloric acid to form barium chloride, adding thereto an excess of sodium hydrate to precipitate barium hydrate and form a sodium chloride solution carrying a small percentage of soluble barium salts, cooling the mixture to a temperature below 20° C., whereby the solubility of the barium hydrate in the liquid menstruum is reduced to a minimum, separating the barium hydrate, adding additional sodium hydrate to the sodium chloride solution to keep the impurities therein in solution, concentrating to produce a mother-liquid carrying suspended sodium chloride crystals, sodium hydrate, and a small quantity of soluble sodium chloride and dissolved barium salts, separating the suspended sodium chloride crystals from the mother-liquid, utilizing the latter carrying a small quantity of soluble barium salts in the barium hydrate precipitation-step, dissolving and electrolyzing the sodium chloride to produce sodium hydrate, chlorine and hydrogen, forming hydrochloric acid from the latter two, utilizing the hydrochloric acid in the barium chloride formation step, and returning the sodium hydrate to the solution-cycle.

9. In a process of recovering barium compounds from residues containing the same, the step of precipitating barium hydrate from a barium chloride solution comprising adding to the latter an excess of alkali hydrate and thereafter cooling the solution at a temperature below 20° C.

10. In a process of recovering alkaline earth compounds from residues containing the same, the step of precipitating an alkaline earth hydrate from an alkaline earth chloride solution comprising adding to the latter an excess of alkali hydrate and thereafter cooling the solution at a temperature below 20° C.

11. In a process of recovering barium compounds from residues containing the same, the step of precipitating barium hydrate from a barium chloride solution, comprising adding to a barium chloride solution carrying 40 grams of barium chloride per 100 grams of water, a sodium hydrate solution carrying 60 grams of sodium hydrate per 100 grams of water, and thereafter cooling the solution at a temperature below 20° C.

12. In a process of recovering barium compounds from residues containing the same, the step of precipitating barium hydrate from a barium chloride solution comprising adding to the latter an excess of alkali hydrate and thereafter cooling sufficiently to reduce the solubility of the barium hydrate in the liquid menstruum to a minimum.

13. In a process of recovering alkaline earth compounds from residues containing the same, the step of precipitating an alkaline earth hydrate from an alkaline earth chloride solution comprising adding to the latter an excess of alkali hydrate and thereafter cooling the solution sufficiently to reduce the solubility of the alkali hydrate in the liquid menstruum to a minimum.

In testimony whereof I have affixed my signature.

RALPH W. SHAFOR.